A. KADOW.
VEHICLE BODY EQUALIZING MEANS.
APPLICATION FILED FEB. 21, 1921.
1,389,648.
Patented Sept. 6, 1921.
2 SHEETS—SHEET 1.
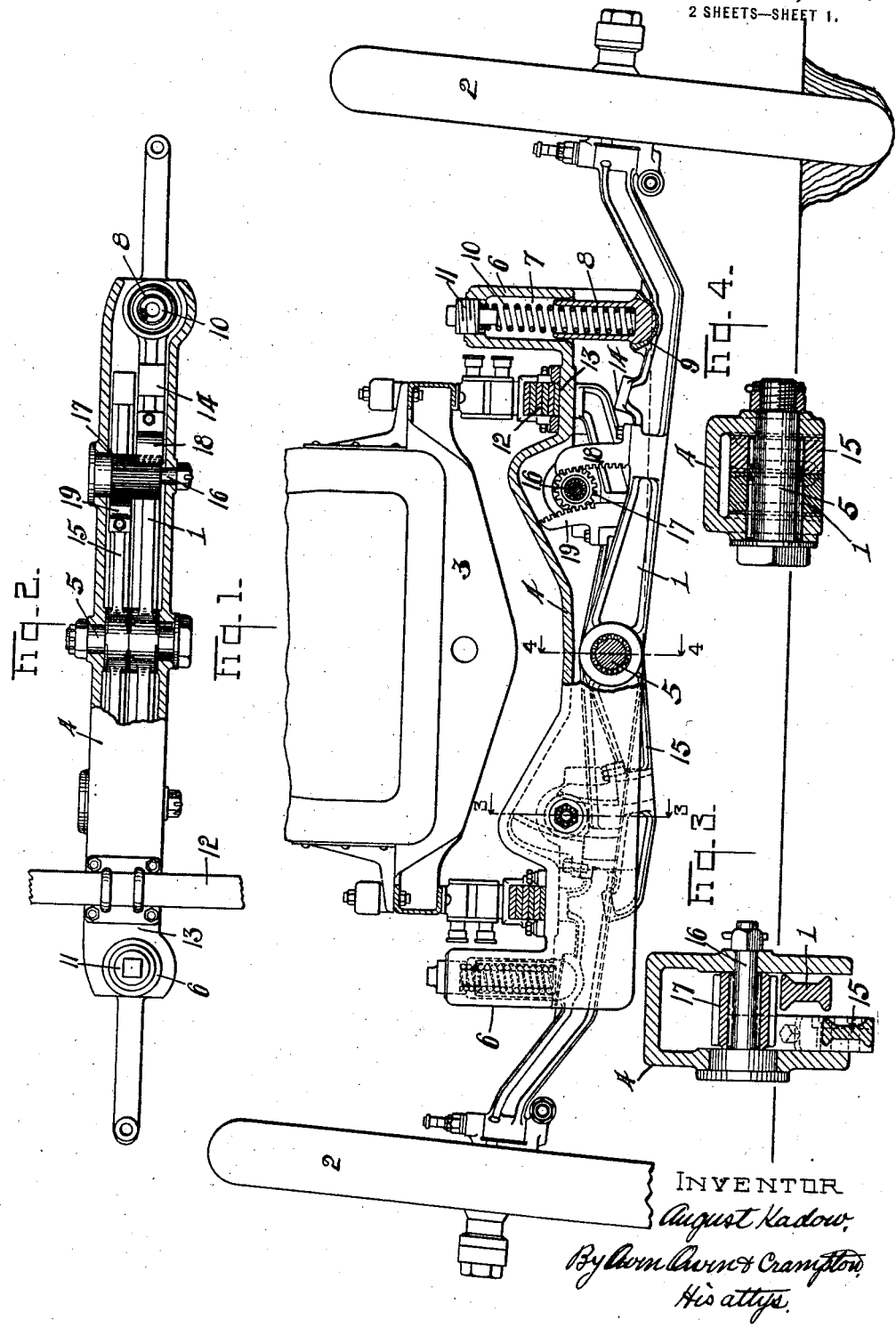
INVENTOR
August Kadow.
By Ahern Owen & Crampton
His attys.

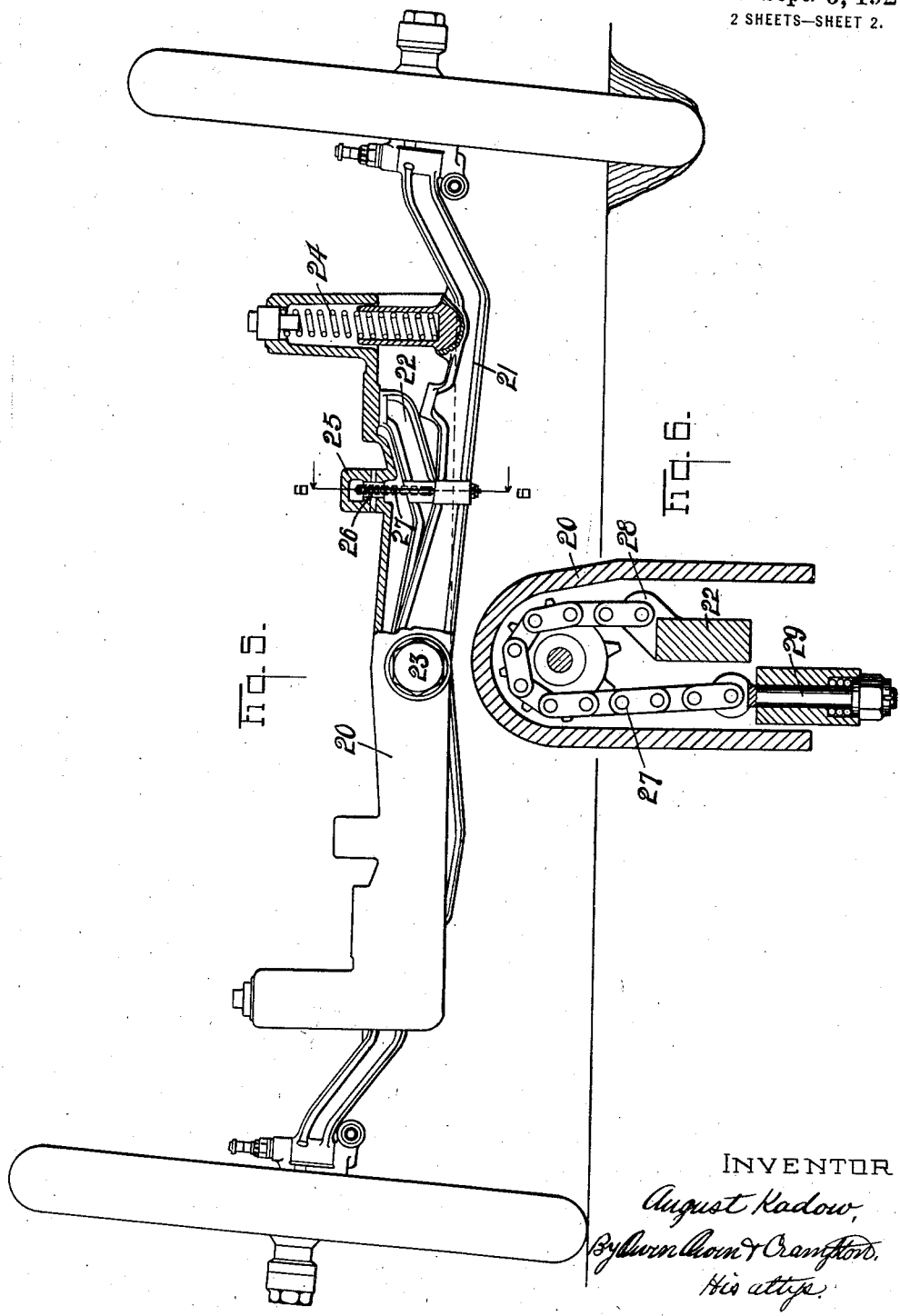

UNITED STATES PATENT OFFICE.

AUGUST KADOW, OF TOLEDO, OHIO.

VEHICLE-BODY-EQUALIZING MEANS.

1,389,648.     Specification of Letters Patent.   Patented Sept. 6, 1921.

Application filed February 21, 1921. Serial No. 446,852.

*To all whom it may concern:*

Be it known that I, AUGUST KADOW, a citizen of the United States, and a resident of Toledo, in the county of Lucas and State of Ohio, have made an Invention Appertaining to Vehicle-Body-Equalizing Means; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to means for equalizing or maintaining the level of vehicle bodies or frames when a wheel thereof drops into a rut or depression in the road or pavement, and has for its primary object the provision of a simple and efficient mechanism for accomplishing this purpose.

The invention is fully described in the following specification, and while, in its broader aspect, it is capable of embodiments in numerous forms, two embodiments only thereof are illustrated in the accompanying drawings, in which,—

Figure 1 is a front fragmentary elevation of a vehicle embodying the invention, with parts broken away, and with the axle tilted, Fig. 2 is a top plan view of the means embodying the invention, with a part broken away. Figs. 3 and 4 are enlarged sections on the lines 3—3 and 4—4, respectively, in Fig. 1. Fig. 5 is a front elevation of a slightly different form of the invention, and Fig. 6 is an enlarged cross section thereof on the line 6—6 in Fig. 5.

Referring to the drawings, 1 designates, in the present instance, the front axle of an automobile, 2 the wheels carried at the ends thereof, and 3 the vehicle frame or body.

A cross-frame or housing 4 of inverted U-form in cross-section is mounted over the vehicle in straddling relation thereto, and is pivoted at its center to the center of the vehicle by a pivot pin or bolt 5. The cross-frame 4 has a hollow open bottom part 6 extending upward from each end thereof and forming a socket 7, and each socket receives a hollow or socketed plug 8, which rises from and preferably has a ball-and-socket-joint connection 9 with the axle. A shock absorbing spring 10 of coiled form is mounted at its lower end in each plunger 8, and extends up into the associated socket 7, with its upper end thrust against an adjustable plug 11. These springs normally retain the cross-frame and axle in parallel relation, or with both ends of the frame equally spaced from the axle. The vehicle body or frame 2 is carried by the cross-frame 4 preferably through the medium of side springs 12, which in the present instance, are of the semi-elliptic type and rest on and are bolted intermediate their ends to the cross-frame top, which is provided near its ends with seats 13 for such purpose. The tilting of the axle 1 relative to the cross-frame 4 is limited by lugs 14 on the axle top striking the under side of the respective spring seats 13 of the cross-frame.

An equalizing lever 15 is pivoted centrally of its ends on the pivot pin or bolt 5 at the rear side of the axle, and within the cross-frame or housing 4 therewith, and for rocking movements relative to the axle and frame. Both the axle and equalizing lever may have anti-friction bearings on the pivot pin 5. The lever 15 has its ends up-turned or suitably fashioned, and terminating in positions to have stop contact with the under sides of the respective spring seats 13 of the cross-frame to limit the relative rocking movements of the lever and frame.

The cross-frame 4, at a distance from each side of its rocking center, is provided with a shaft 16 disposed transversely thereof above the axle and equalizing lever, and has a broad faced pinion 17 mounted for free rotation thereon within the cross-frame. A segmental rack-arm 18 fixedly rises from the axle 1 at the outer side of each pinion 17 in mesh therewith, and a similar rack-arm 19 fixedly rises from each end portion of the lever 15 at the inner side of the respective pinion in mesh therewith. It is thus evident that upon a lowering of one end of the axle, as, for instance, by reason of the wheel 2 at such end dropping into a rut or hole, the cross-frame 4 will remain substantially level, and the equalizing lever 15 will have a rocking movement corresponding to that of the axle, except in the reverse direction thereto, imparted to it from the axle through the rack-arms 18 and 19 and pinion 17. In other words, a rocking of the axle will cause one rack-arm 18 to lower and the other to rise relative to the cross-frame 4, thereby turning the pinions 17 in the same direction and causing a lowering of one rack-arm 19 and a raising of the other, so that the lever 15 will have a corresponding reverse rocking movement to that of the axle. When the lever and axle have reached their limits of relative rocking movements the stop-lug 14 on the elevated end of the axle, and the elevated end of the lever, move into contact at approximately the same time with the top wall of the cross-frame so that they coöperate to hold the cross-frame level.

In the form of the invention illustrated in Figs. 5 and 6 the construction and arrangement of parts is substantially the same as that above described, except that a different means is employed to communicate reverse rocking movements to the equalizing lever from a rocking of the axle. In this form of the invention 20 designates the cross-frame which is mounted over and straddles the axle and equalizing lever, 21 the axle, and 22 the equalizing lever, which axle and lever are mounted at their centers for relative rocking movements on a bolt or pin 23 projecting centrally through the cross-frame 20. The ends of the axle are yieldingly spaced from the ends of the cross-frame by springs 24 the same as in the other form of the invention.

The cross-frame 20 is provided at opposite sides of its center with upwardly projecting hollow bosses 25, in each of which is mounted a sprocket-wheel 26, with its axis disposed lengthwise of the cross-frame. A chain 27 extends over the sprocket-wheel 26 and has one end connected to a lug 28 on the adjacent end of the equalizing lever 22, and its other end connected to a bolt 29, which is adjustably attached to the adjacent end portion of the axle 21. It is thus evident that upon a rocking of the axle 21 in either direction, a rocking movement in the opposite direction will be communicated to the equalizing lever 22 through the chain or flexible connecting member 27.

It is evident that I have provided simple and efficient means for maintaining a vehicle body or frame in substantially level position during different vertical rocking movements of the axle so that the wheels carried by the axle may follow irregularities or uneven places in a pavement or road without disturbing the level or substantially level position of the vehicle body.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent, is,—

1. In a vehicle, a body supporting frame, an axle and an equalizing lever centrally carried by the frame for vertical rocking movements relative thereto and to each other, means for imparting opposed rocking movements to the lever and axle when either is rocked, and yielding connection between the frame and axle at both sides of the axle center.

2. In a vehicle, a body supporting frame, an axle and a lever connected together for relative vertical rocking movements, the axle and lever each adapted to have stop coaction with the frame when rocked a predetermined extent relative thereto, cushion means between the frame and axle at opposite sides of their centers, and means for imparting opposed rocking movements to the lever and axle when either is rocked.

3. In a vehicle, an axle, a cross-frame and an equalizing lever pivoted to the axle for rocking movements relative thereto and to each other, means yieldingly retaining the axle and cross-frame in neutral relation to each other, and means connecting the frame, axle and lever, and operable by a relative rocking movement of the axle and cross-frame to impart a rocking movement to the lever which is opposed to that of the axle.

4. In a vehicle, an axle, a hollow cross member straddling the axle and pivoted thereto for relative vertical rocking movements, means normally retaining the axle and cross member in neutral relation, a vehicle body supported by the cross member, a lever mounted on the pivot with the cross member, and means for imparting opposed rocking movements to the axle and lever when the former is rocked to cause a portion of the axle at one side and a portion of the lever at the other side at the rocking pivot to move into coaction with the cross member when the axle and lever have been relatively rocked a predetermined extent.

5. In a vehicle, an axle, a center pivot pin carried by the axle and extending transversely thereof, a cross member and a lever disposed longitudinally of the axle, and both centrally carried by the pivot pin for vertical rocking movements relative to each other and to the axle, means normally retaining the cross member and axle in neutral relation, a vehicle body carried by the cross member, and means for imparting opposed rocking movements to the axle and lever when the former is rocking, and to cause a portion of the axle at either side and a portion of the lever at the other side of the pivot pin to move into stop engagement with the cross member.

6. In a vehicle, an axle, a pivot pin carried by the axle adjacent its center, and extending transverse thereto, a frame member forming a housing for straddling the axle and mounted on the pivot pin, a coiled compression spring mounted between the ends of the frame member and the axle to normally retain the member and axle in neutral relation, a lever mounted on the pivot pin within the frame member for rocking movements relative thereto and to the axle, and means operable to impart opposed rocking movements to the axle and lever relative to the frame member when the axle is rocked, the axle and lever when rocked a predetermined extent having coaction at opposite sides of the pivot pin with the frame member.

In testimony whereof I have hereunto signed my name to this specification.

AUGUST KADOW.